Aug. 2, 1966 W. H. JONES 3,264,074

THIN FILM ELECTRON EMISSIVE ELECTRODE

Filed April 4, 1962 2 Sheets-Sheet 1

INVENTOR.
WILLIAM H. JONES

BY Richard P. Alberi

AGENT

THIN FILM ELECTRON EMISSIVE ELECTRODE

Filed April 4, 1962 2 Sheets-Sheet 2

INVENTOR.
WILLIAM H. JONES
BY
Richard P. Alberi
AGENT 3,264,074

THIN FILM ELECTRON EMISSIVE ELECTRODE

William H. Jones, Santa Monica, Calif., assignor, by mesne assignments, to Lear Siegler, Inc., Santa Monica, Calif., a corporation of Delaware Filed Apr. 4, 1962, Ser. No. 185,015
8 Claims. (Cl. 29—183.5)

This invention relates to metal films on inorganic non-conductive materials such as glass, ceramic, and the like, and more particularly to metal conductive films which are adherent to non-conductive materials such as glass, ceramics, and the like, over a wide temperature range.

It is extremely difficult to make a metal conductor adhere to glass, ceramic, or the like. One method generally used is to evaporate the metal in a vacuum chamber through a mask onto a substrate, the substrate being the glass, ceramic, or the like, which may or may not be heated. If the substrate is heated, the temperature is maintained below the melting point of the substrate and the metal film being deposited. The difficulty with this method is that only a relatively thin layer of metal can be evaporatively deposited because if the layer becomes too thick, it will peel off. Consequently, the current carrying capability of the thin film evaporatively deposited metal conductor is very limited. Furthermore, the thin film conductors thus deposited cannot withstand the high temperatures required when the glass, on which the metal conductor is deposited, is to be sealed in a vacuum container in a manner such that the leads extend out of the vacuum container. Attempt to seal at lower temperatures does not result in the desired seal being accomplished.

Another method of providing metal conductors on or in glass, ceramic, or the like, is to position wires or metal conductors by potting the wires in a glass, ceramic, or other non-conducting material. The disadvantage of using wires and potting them in place is that it is difficult to position the wires accurately and, therefore, the labor costs are high. This is especially true where a number of conductors are to be positioned in close proximity.

It is, therefore, an object of this invention to provide metal films on glass, ceramic, or the like.

Another object of this invention is to provide metal films on glass, ceramic, or the like, which will withstand high temperatures.

Still another object of the present invention is to provide metal films on glass, ceramic, or the like, which have high current carrying capabilities.

Another object of the present invention is to provide metal films on glass, ceramic, or the like, which permit an insulating high vacuum seal to surround the metal films.

A further object of the present invention is to provide an apparatus having metal conductors on a glass, ceramic, plastic, calcium fluoride, or the like, permitting a high temperature seal to be made around the metal conductors.

A still further object of the present invention is to provide a method of putting a metal conductor on glass, ceramic, plastic, calcium fluoride, or the like, which will adhere to the glass, ceramic, plastic, calcium fluoride, or the like, have high current carrying capabilities, and withstand high temperature.

The above and other objects of this invention are accomplished by a metal conductor on an electrically non-conductive material comprising: an electrically non-conductive substrate, a first thin film of metal having adhesion characteristics toward said substrate and positioned on said substrate; and a second film electroplated on said first film.

Other objects and advantages of the present invention will become apparent from the following description when taken in conjunction with the drawings, in which:

FIG. 3 is an enlarged end view of the present invention showing the layers of material on the glass, ceramic, or the like.

Figure 1:
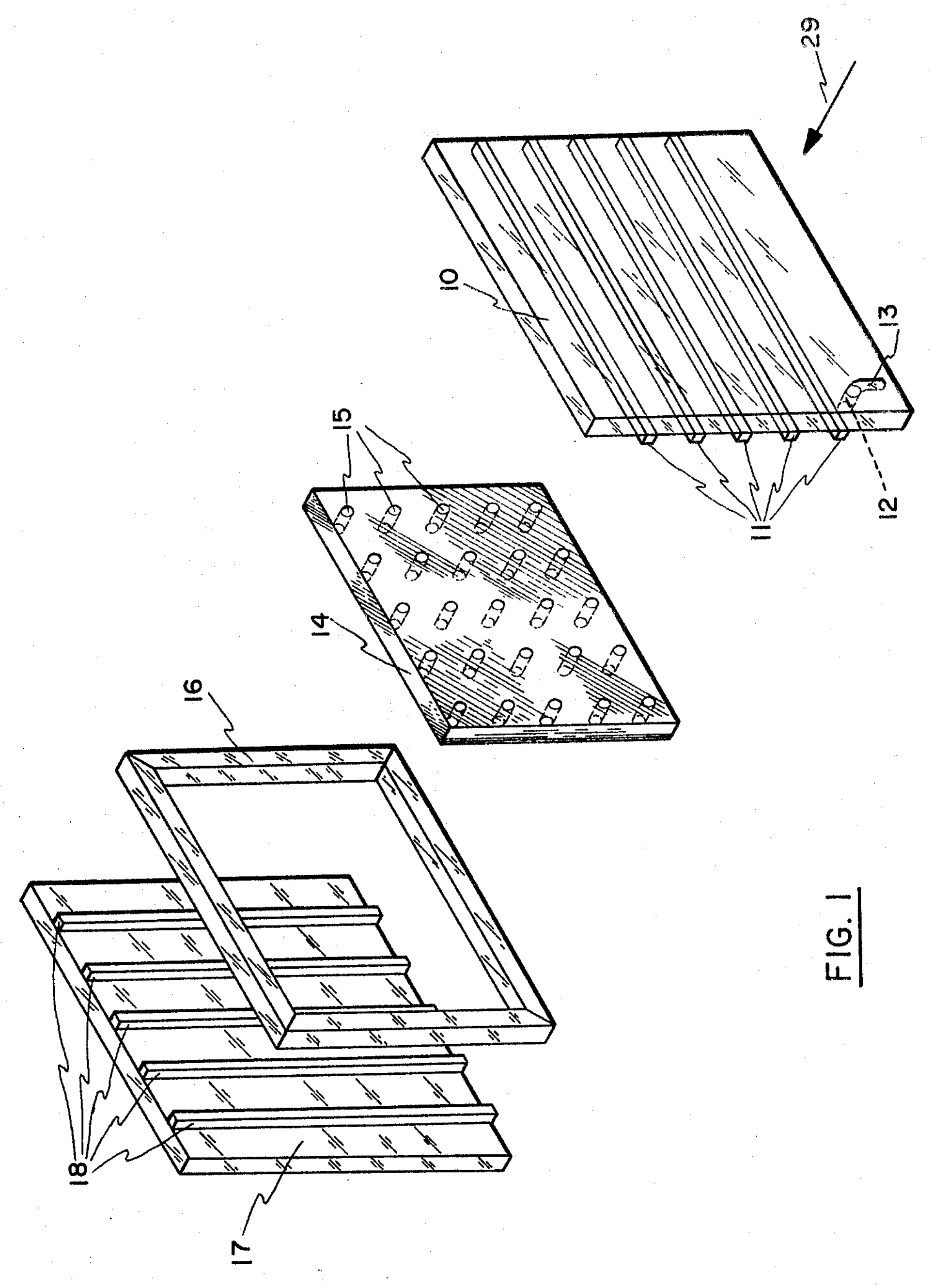
FIG. 1 is an exploded perspective view of an apparatus utilizing the present invention.

The apparatus shown in FIG. 1 illustrates an apparatus in which the metal-to-glass conductors are used, and has a face plate 10 with metal conductors 11 thereon. A hole 12 is provided through the face of the glass and a glass tube 13, used for evacuating the apparatus, extends from the face of the plate 10 in the location of the hole 12. An insert member 14 has holes 15 therein positioned in rows and columns; the horizontal lines of holes 15 being in alignment with the horizontal electrodes 11.

The frame 16 is slightly larger than the insert 14. The insert 14 fits inside the frame 16. The end plate 17 has vertical conductors 18 on one side thereof facing the insert 14. The vertical conductors 18 are in line with the vertical rows of the holes 15.

The device shown in FIG. 1, when assembled, is an X–Y plotter. The insert 14 is positioned inside the frame 16, the frame 16 is positioned up against the end plate 17 and the end plate 10 is positioned on the other side of the frame 16. The unit is sealed around the edges and evacuated by a vacuum pump through the tube 13 and hole 12, and then is filled with a gas such as neon, argon, krypton, or the like, or any combination thereof.

It is to be noted that in the drawings, the thickness of electrodes 11 and 18 are considerably out of proportion to facilitate explanation and when the unit is sealed, the sealant fills the small space between the electrodes.

The sealing may be with glass or frit under high temperatures, or under pressure and high temperatures with techniques well known in the art.

The application of an electrical potential to one of the electrodes 18 and one of the electrodes 11, provides for a potential drop therebetween, and results in a potential drop between the two ends of a hole in insert 14. This potential applied across the selected electrodes 11 and 18, causes the gas in the selected hole 15 to illuminate.

Figure 2:
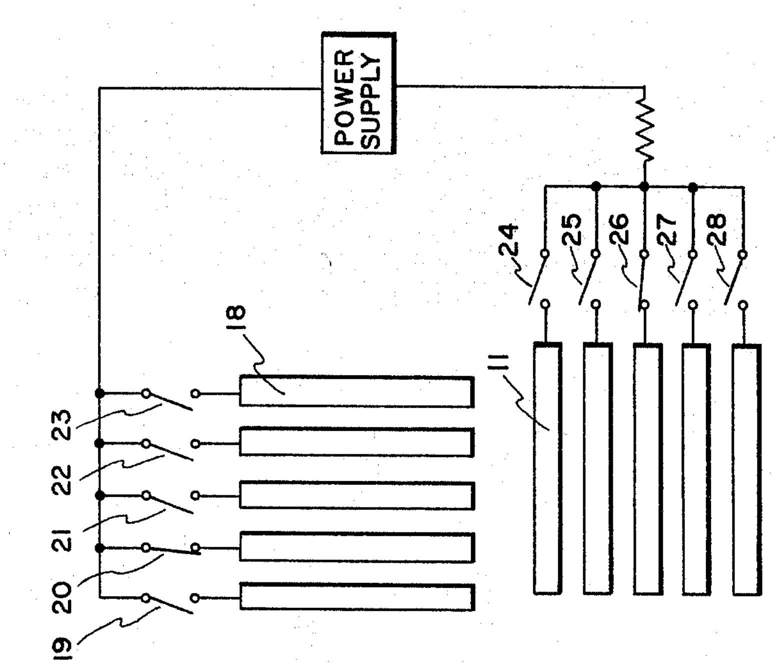
FIG. 2 is a schematic of the wiring diagram of the apparatus shown in FIG. 1.

FIG. 2 is a schematic showing the power supply on one side connected to the vertical conductors 18 by way of switches 19, 20, 21, 22, and 23, and the other side of the power supply connected to the electrodes 11 by way of switches 24, 25, 26, 27 and 28. Note, that switches 20 and 26 are closed, thereby completing the path between the second vertical conductor and the middle horizontal conductor.

Figure 3:
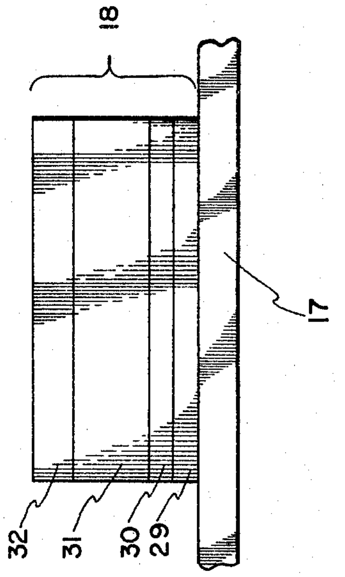

Since this apparatus is an X–Y plotter, it is desirable to be able to visually observe which hole 15 is ignited. For this reason, if the apparatus is to be viewed from the direction indicated by the arrow 29, then the electrodes 11 must be transparent. These electrodes can be made by depositing $InO_2$, or $SnO_2$, doped with other metals such as antimony, or cadmium as well known in the art, through a mask onto the plate 10. Since this apparatus functions due to the electrical discharge, which, in effect, is an electron discharge from one electrode to another, the thin film of electrodes have a tendency to resist electron emission. Therefore, electrodes 18 must now be the electron emission electrodes. In order for electrodes or conductors 18 to be suitable for electron emission, they are prepared as follows with reference to FIG. 3.

On the substrate or end plate 17, a thin film 29 of Nichrome which readily adheres to the substrate, for example 500 angstroms thick, is vacuum deposited through a mask. The thickness of film 29 can range from 200 to 1000 angstroms. Such deposition is made by methods well known in the art, as, for example, evaporation from a heated container. A second thin film 30 of copper, approximately 2000 angstroms in thickness, is evaporatively vacuum deposited over the Nichrome film 29 to form a base for subsequent electroplating of a conductor. Again, such evaporation is well known in the art. The thickness of film 30 can range from 1500 to 7000 angstroms. Subsequently, a third conductive layer 31 is electroplated onto the layer 30. The layer 31 can be an alloy composition of iron and nickel, for example, iron containing from about 33 weight percent to about 55 weight percent nickel. The particular composition of the ratio of iron to nickel, or other alloy, is selected to exhibit a temperature coefficient of expansion closely approximating that of the glass or ceramic plate 17. The thickness of the layer 31 can be from about .0001 inch to about .002 inch. The electroplating is possible because the second layer 30 is copper and, therefore, has sufficient conductive capabilities. The electroplating of the layer 31 provides an electrode or conductor 18 which adheres to the glass, and, further is sufficiently thick to carry high current and is particularly adaptable to electron emission. The conductor 18 may be subsequently coated with a layer 32 of aluminum, for example, 5000 angstroms in thickness, using common vacuum techniques. The aluminum layer 32 is used primarily when the conductor 18 must withstand not only high temperatures, but, also, an oxygen atmosphere.

The layer 30 can be eliminated by using a beryllium-copper alloy for layer 29. The use of beryllium-copper allows a relatively thick layer to be vacuum deposited as a base for subsequent electroplating thereon. The percentage of beryllium can be from 0.3 to ten percent by weight with the remainder copper. Examples of still other substances containing beryllium that can be employed are more fully described in a patent application of the common assignee bearing Serial No. 166,415.

The metal film patterns may also be achieved by first applying successive coatings to one whole surface of plate 17. Then a resist coating is applied with a silk screen or photo-resist methods to protect the desired pattern. This is followed by chemically etching the unwanted portions of the film. This etching technique is well known in the art.

Another device in conjunction with which the present invention can be used is an electroluminescent device using the same grid or condutor patterns as shown in FIGS. 1 and 2, but insert 14 and frame 16 are replaced by an electroluminescent phosphor coating positioned between conductors 11 and 18. A non-limiting example of a phosphor used in such coating is zinc sulfide. Such devices are also well known in the art but without the use of the present invention concerning the conductors.

Another example wherein the present invention may be utilized will be found in the co-pending application of the common assignee bearing Serial Number 185,075, filed April 4, 1962 and now Patent Number 3,157,824.

The use of the present invention substantially eliminates the problem of the conductors burning out, thereby breaking the electrical circuit, due to the heat generated in the devices.

*Example I*

A plate 17 of glass having temperature coefficient of expansion of $82\times10^{-7}$ had conductors 18 deposited thereon with the layer 29 being Nichrome and having a thickness of 500 angstroms. The layer 30 was copper and 2000 angstroms thick. The layer 31 was 47% nickel and 53% iron, and .001 inch thick. The resulting combination provided a film which had extremely good adhesion between the plate 17 and electrode 18 and extremely good conductivity due to the alloy layer 31. This electrode was subjected to temperatures in excess of 475 degrees centigrade without appreciably affecting the conductivity of the electrode 18 or the adhesion of the electrode 18 to the plate 17.

*Example II*

A plate 17 of glass having a temperature coefficient of expansion of $82\times10^{-7}$ had conductors 18 deposited thereon with the layer 29 being 1.5% beryllium and the rest copper and having a thickness of 15000 angstroms. The layer 30 was omitted. The layer 31 was 47% nickel and 53% iron and .0015 inch thick. The resulting combination provided a film which had extremely good adhesion between the plate 17 and electrode 18 and extremely good conductivity due to the alloy layer 31. This electrode was subjected to temperatures in excess of 475 degrees centigrade without appreciably affecting the conductivity of the electrode 18 or the adhesion of the electrode 18 to the plate 17.

*Example III*

A plate 17 of Pyrex with a temperature coefficient of expansion of $82\times10^{-7}$ had conductors 18 deposited thereon with the layer 29 being Nichrome and having a thickness of 300 angstroms. The layer 30 was copper and 3000 angstroms thick. The layer 31 was 39% nickel and 61% iron and .001 inch thick. The resulting combination provided a film which had extremely good adhesion between the plate 17 and electrode 18 and extremely good conductivity due to the alloy layer 31. This electrode was subjected to temperatures in excess of 575 degrees centigrade without appreciably affecting the conductivity of the electrode 18 or the adhesion of the electrode 18 to the plate 17.

*Example IV*

The apparatus shown in FIG. 1 was constructed with the end plates 10 and 17 being glass and having a temperature coefficient of expansion of $82\times10^{-7}$. The electrodes 11 were vapor deposited in $InO_2$ doped with antimony. Electrodes 18 were constructed as in Example I. The unit was sealed with glass frit, the frame 16 was glass and the insert 14 was glass, the unit was evacuated through the glass tube 13 and neon gas was introduced into the unit. The electrodes 18 and 11 were electrically connected as shown in FIG. 2 and the resultant device provided a display whereby any given cell was illuminated by proper selection of one electrode 18 and one electrode 11. More than one cell was illuminated by selecting more than one of the electrodes 18 and/or more than one of the electrodes 11. The device then provided a visual display wherein the illuminated cell corresponded to the corresponding selected electrodes 18 and 11.

This device can be used in many other applications, for example by making the holes small enough and electrodes close enough, the device can actually display a picture. The device may also be used in advertising displays to print letters or words successively or simultaneously.

*Example V*

The same structure as in Example IV was made with the modification that the electrodes 18 were as provided in Example II. This structure likewise gave satisfactory results when employed as a display as described in Example IV.

Although this invention has been particularly described above, it is not intended that it should be limited by the above description, but only in accordance with the spirit and scope of the appended claims.

What I claim is:

1. A thin film, electron-emissive electrode with good adherence characteristics on an insulating base comprising:

a glass substrate, a first thin film layer of a beryllium-copper alloy containing from about 0.3 to about 10 weight percent beryllium, deposited on said substrate, and a second thin film layer of an electron-emissive iron and nickel composition containing from about 33 weight percent to about 55 weight percent nickel deposited on said first thin film layer.

2. The thin film, electron-emissive electrode with good adherence characteristics on an insulating base of claim 1 comprising in addition a third thin film layer of aluminum deposited on said second thin film layer.

3. A thin film, electron-emissive electrode with good adherence characteristics on an insulating base comprising:
a glass substrate,
a first thin film layer of Nichrome deposited on said substrate,
a second thin film layer of copper deposited on said first thin film layer, and
a third thin film layer of an electron-emissive iron and nickel composition containing from about 33 weight percent to about 55 weight percent nickel deposited on said second thin film layer.

4. A thin film, electron-emissive electrode with good adherence characteristics on an insulating base comprising:
a glass substrate,
a first thin film layer aving a thickness of from about 200 to about 1000 angstroms of a beryllium-copper composition containing from about 0.3 to about 10 weight percent beryllium, deposited on said substrate, and
a second thin film layer having a thickness of from about .0001 inch to about .002 inch of an electron-emissive iron-nickel composition containing from about 33 weight percent to about 55 weight percent nickel, deposited on said first thin film layer.

5. The thin film, electron-emissive electrode of claim 4 and further comprising a third thin film protective layer of aluminum deposited on said second thin film layer.

6. A thin film, electron-emissive electrode with good adherence characteristics on an insulating base comprising:
an electrically non-conductive substrate,
a first thin film layer of Nichome having a thickness of from about 200 to about 1000 angstroms deposited on said substrate,
a second thin film layer of copper having a thickness of from about 1500 to about 7000 angstroms deposited on said first thin film layer, and
a third thin film layer having a thickness of from about .0001 inch to about .002 inch of an iron and nickel composition containing from about 33 weight percent to about 55 weight percent nickel, deposited on said second thin film layer.

7. A thin film, electron-emissive electrode with good adherence characteristics on an insulating base comprising:
an electrically non-conductive substrate,
a first thin film layer of Nichrome deposited on said substrate,
a second thin film layer of an iron and nickel composition containing from about 33 weight percent to about 55 weight percent nickel deposited on said first thin film layer, and
a third thin film layer of aluminum deposited on said second thin film layer.

8. A thin film, electron-emissive electrode with good adherence charcteristics on an insulating base comprising:
an electrically non-conductive substrate,
a first thin film layer of Nichrome having a thickness of from about 5,000 to about 10,000 angstroms deposited on said substrate,
a second thin film layer having a thickness of from about 10,000 to about 50,000 angstroms of an iron and nickel composition containing from about 33 weight percent to about 55 weight percent nickel deposited on said second thin film layer, and
a third thin film layer of aluminum having a thickness of from about 300 to about 800 angstroms deposited on said second thin film layer.

References Cited by the Examiner

UNITED STATES PATENTS

| | | | |
|---|---|---|---|
| 2,728,693 | 12/1955 | Cado | 204—20 X |
| 2,763,822 | 9/1956 | Frola | 317—234 |
| 2,798,577 | 7/1957 | La Forge | 189—36.5 |
| 2,886,470 | 5/1959 | Park | 117—126 |
| 2,934,458 | 4/1960 | Budd | 117—126 |
| 2,934,479 | 4/1960 | Deer | 304—15 |
| 2,953,849 | 9/1960 | Morgan | 29—419 |
| 2,971,251 | 2/1961 | Willemse | 29—195 |
| 2,972,707 | 2/1961 | Wood | 315—169 |
| 2,991,394 | 7/1961 | Archer et al. | 315—169 |
| 3,006,819 | 10/1961 | Wilson et al. | 204—15 |
| 3,010,189 | 4/1961 | Fike | 29—195 |
| 3,013,182 | 12/1961 | Russell | 315—169 |
| 3,042,591 | 7/1962 | Cado | 204—20 |
| 3,091,876 | 6/1963 | Cole | 315—169 |
| 3,150,939 | 9/1964 | Wenner | 29—195 |

HYLAND BIZOT, *Primary Examiner.*

GEORGE WESTBY, *Examiner.*

C. R. CAMPBELL, *Assistant Examiner.*